(12) United States Patent
Ishihara

(10) Patent No.: US 6,520,681 B2
(45) Date of Patent: Feb. 18, 2003

(54) LINEAR MOTION GUIDE UNIT

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/951,712

(22) Filed: Sep. 14, 2001

(65) Prior Publication Data

US 2002/0141667 A1 Oct. 3, 2002

(30) Foreign Application Priority Data

Mar. 29, 2001 (JP) ........................................ 2001-095884

(51) Int. Cl.$^7$ ............................................... F16C 29/06
(52) U.S. Cl. ......................................................... 384/45
(58) Field of Search ............................. 384/45, 44, 43; 464/168

(56) References Cited

U.S. PATENT DOCUMENTS 5,613,780 A   3/1997  Ng

FOREIGN PATENT DOCUMENTS

| CH | 675011 | 8/1990 |
|---|---|---|
| DE | 296 13 277 | 2/1997 |
| EP | 0 494 682 | 7/1992 |
| EP | 0 676 553 | 10/1995 |
| EP | 2775129 | 5/1998 |
| EP | 0 875 684 | 11/1998 |
| EP | 0 982 509 | 3/2000 |
| JP | 133122 | 9/1986 |
| JP | 248018 | 9/1992 |
| JP | 2846050 | 10/1998 |
| JP | 2936166 | 6/1999 |

OTHER PUBLICATIONS

Patent Abstracts of Japan, Publication No. 06147222, Publication Date May 27, 1994, "Directly Acting Type Guide Device", Eguchi Shoji.

*Primary Examiner*—Lenard A. Footland
(74) *Attorney, Agent, or Firm*—Browdy and Neimark

(57) ABSTRACT

A linear motion guide unit is disclosed, in which components are assembled in a mutually fitting relation with one another into a composite construction. This allows reducing the number of components to cope with a modern tendency of miniaturization of the linear motion guide system. The slider is composed of a carriage, end caps mounted on the fore-and-aft ends of the carriage, and carriage frame. The carriage has on inside surface thereof raceway grooves, while on outside surfaces thereof recesses and return-passage grooves. The end caps have turnarounds therein. The carriage frame includes side panels opposing to the outside surfaces of the carriage and end panels opposing to fore-and-aft end surfaces of the end caps. The side panels are made on the inside surfaces thereof with projections. For assembling the components into an unitary composite construction, the carriage together with the end caps is accommodated and held in the carriage frame by press fit of the projections of the side panels of the carriage frame into the recesses of the carriage.

16 Claims, 15 Drawing Sheets

LINEAR MOTION GUIDE UNIT

BACKGROUND OF THE INVENTION

1. Field of the Invention

The present invention relates to a linear motion guide unit adapted for use in various types of machinery such as diverse industrial robots, semiconductor manufacturing machines, machine tools, and so on.

2. Description of the Prior Art

Most linear motion guide units used extensively in diverse fields of machinery such as various industrial robots, semiconductor manufacturing apparatus, precision machines, machine tools, and so on are in general comprised of a track rail and a slider, which fits over and conforms to the track rail for sliding movement. The slider is chiefly composed of a carriage and end caps. In most sliders ever used, the carriage is usually jointed together with the end caps by tightening machine screws and so on. Among the more recent advances in sliders, on the other hand, is known a slider in which the components: carriage and end caps are joined together in a fitting relation with no use of any fastener.

A linear motion guide arrangement is disclosed in, for example Japanese Patent No. 2936116, in which the snap connection means are used to secure the carriage member and the reversing bodies to the guide carriage housing. Thus, there is disclosed a construction in which no fixing screw is used for jointing together components and parts. In detail, the reversing bodies are secured to the fore-and-aft ends of the carriage, one to each end, with the projections of the reversing bodies coming into engagement with the grooves on the upper side of the carriage. The combination of the carriage and reversing bodies is accommodated in the guide carriage housing with the fore-and-aft outside end faces being covered with the guide carriage housing and held in position by the snap connection means. With the linear motion guide arrangement recited earlier, moreover, there is provided a recirculating-ball circuit including a return guide raceway formed in the carriage and curved ball guides formed in the reversing bodies, one to each body. Engagement of the grooves on the upper side of the carriage with the projections of the reversing bodies serves to bring the curved ball guides into alignment with the return guide raceway, thereby establishing the recirculating-ball circuit. In addition, the sealing plates are applied to the end surfaces of the end plates of the guide carriage housing and locked by snapping any locking nose of the sealing plates into the associated locking recess in the end plates of the guide carriage housing.

Disclosed in Japanese Utility Model Laid-Open No. 133122/1986 is a linear guide means in which a slider body has mounted on fore-and-aft ends thereof with end caps, one to each end, and the resulting combination fits in a carriage housing with being encircled with the housing. Then, bolts are screwed to unite together all the slider body, end caps and housing. In the prior linear guide means recited just above, the turnarounds and the return passages provided for the recirculating-ball circuits are formed in separate components, that is, the turnarounds are made in the end caps, one to each cap, while the return passages are constituted with the combined slider body and carriage housing. End seals to be kept in sliding contact with a tack rail are formed integrally with the carriage housing. Nevertheless, the linear guide means needs more than one fastener such as a bolt to join together all the slider body, end caps and carriage housing into an unit. As the turnarounds and the return passages provided for the recirculating-ball circuits are formed in separate components, that is, the turnarounds are made in the end caps, while the return passages are formed between the slider body and the carriage housing, accurate alignment in position of the turnarounds with the associated return passages is inevitable to ensure the recirculating-ball circuits allowing the rolling elements to run smoothly through there. Besides, the end caps and the carriage housing are made of the same synthetic resins.

In Japanese Patent No. 2846050 there is disclosed a linear sliding-motion bearing system having a slider that is comprised of a block of a thick plate provided underneath with a pair of widthwise opposing legs, an annular frame formed in a tetragonal configuration in top plan view so as to fit over the legs and having therein non-loaded raceway grooves allowing rolling elements to run through there with less subject to load, and a pair of elongated plates made therein with non-loaded raceway grooves, one to each plate. On assembly to complete the slider unit, the annular frame is secured around the legs by locking projections of the annular frame in recesses made on the outside faces of the legs. Then, the paired elongated plates are each fastened to the annular frame by inserting pins at four corners of the annular frame into holes in the elongated plates. With the linear sliding-motion bearing system constructed as stated earlier, since the annular frame is secured to the legs in a way the projections of the annular frame click into the associated recesses formed on the outside faces of the legs, there is no need to use any fastener such as a bolt or the like. Besides, the end seals are constructed to fit snugly in grooves formed in both the annular frame and the paired elongated plates. The linear sliding-motion bearing system recited above, though so constructed as to use no fastener such as a bolt in the assembly process, is adversely bulky in size because of the legs jutting out from the underneath of the thick plate. The non-loaded raceways provided between the confronting annular frame and elongated plates result in rendering the slider large in widthwise dimension. Any attempt to reduce the slider in width will result in rendering the legs slim in their breadth, thus raising a major disadvantage of reducing the slider in rigidity or stiffness. Besides, the recesses in which projections of the annular frame fit to join together them are formed in inner corners near the roots of the legs, while the annular frame is made considerably thick. This construction will plague the workers with a troublesome exertion of bending forcibly the projections to bring them into interlocking engagement with the inner recesses.

Another linear guide arrangement is disclosed in Japanese Patent laid-Open No. 248018/1992, in which a sliding block is composed of first and second block members, which are fastened together by screws.

In Japanese Patent No. 2775129 there is disclosed a linear guide arrangement in which a slider is constituted with a first member made therein with non-loaded passages for recirculating-ball circuits, a second member made with load raceway grooves, and third members arranged on forward and aft ends of the second member, one to each end, in a manner fitting in the first member together with the second member. With the linear guide arrangement recited just above, the first member is provided therein with the non-loaded area: return passages and turnarounds for the recirculating-ball circuits, whereas the second member is grooved to provide the load raceways. Thus, these members are made with drilled or cored holes in which fasteners fit to join together the members to complete the circulating-ball circuits.

SUMMARY OF THE INVENTION

The present invention, therefore, has as its primary object to overcome the problems as stated earlier and particularly to provide a linear motion guide arrangement adapted for use in machinery as diverse as semiconductor manufacturing machines, assembly machines and so on, which are made in a wide range of size. The present invention is more particular envisaged to provide a linear motion guide unit that is most preferable for use in very small machines. To this end, the linear motion guide unit of the present invention includes a slider constructed with a carriage, end caps and a carriage frame, each of which has any engaging means that may come into mutually fitting relation with a complementary engaging means of any counterpart, thus allowing to complete a composite construction with even either no use of fasteners such as bolts, screws and so on or no provision of deep recess for engagement with any projection. With the slider constructed as recited earlier, the carriage frame and the carriage, when being fit mutually, may be kept in accurate alignment in position with each other by the use of any positioning means between the carriage and the end caps. This contributes to making the slider as small as possible in size, with even inexpensive, and also reducing the number of parts or components required. No need of fasteners such as bolts and screws results in a reduction in manufacturing steps, with making the manufacturing process and assembly of parts easier, and further helping ensure the rigidity of the slider enough to realize smooth sliding motion of the slider along the track rail.

The present invention is concerned with a linear motion guide unit; comprising a track rail having first raceway grooves on lengthwise sides thereof, a slider conforming to the track rail to fit over the track rail for movement relatively to the track rail and also having second raceway grooves confronting the first raceway grooves, and a recirculating-ball circuit allowing rolling elements to run through there, the recirculating-ball circuit including a load raceway defined between the first and second raceway grooves, a turnaround formed in the slider and connected at any one end thereof with the load raceway, and a return passage formed in the slider and connected to another end of the turnaround; wherein the slider is composed of a carriage having the second raceway grooves on inside surfaces thereof and also having recesses and return-passage grooves on outside surfaces thereof, end caps arranged on fore-and-aft ends of the carriage, one to each end, and each made therein with the turnaround, and a carriage frame constituted with side panels facing the outside surfaces of the carriage and end panels facing fore-and-aft outside end surfaces of the end caps; and wherein the side panels of the carriage frame are each made on inside surface thereof with a projection to fit in the associated recess of the carriage, so that the carriage is accommodated together with the end caps into the carriage frame in such a manner that the projection of the carriage frame fits in the recess of the carriage to hold the carriage, end caps and carriage frame in an unitary composite construction.

In one aspect of the present invention, a linear motion guide unit is disclosed in which the carriage frame has a bottom plate covering underneath lower surfaces of the carriage and the end caps.

In another aspect of the present invention, a linear motion guide unit is disclosed in which the side panels of the carriage frame are provided therein with recesses in which sides of the carriage are allowed to fit.

In another aspect of the present invention, a linear motion guide unit is disclosed in which the turnarounds are each composed of a radially outside curved groove formed in the end cap, and a radially inside curved groove formed on a lug attached to a spacer, which is interposed between the carriage and any one of the end caps, with extending breadthwise between the side panels of the carriage frame. As an alternative, the lug is attached to the bottom plate of the carriage frame.

In another aspect of the present invention, a linear motion guide unit is disclosed in which the return passage is composed of an inside raceway groove formed on the carriage, and an outside raceway groove formed in a tongue extending from the end cap in opposition to the inside raceway groove on the carriage. As an alternative, the carriage frame has an extension member on which is formed a raceway groove to be communicated with the raceway grooves of the end caps arranged on the fore-and-aft end surfaces of the carriage. In a further another aspect of the present invention, a linear motion guide unit is disclosed in which the bottom plate of the carriage frame is made therein with a hole, which is allowed to come into engagement with a projection that is formed underneath the tongue extended from the end cap.

In another aspect of the present invention, a linear motion guide unit is disclosed in which the end cap has positioning pins to be fit into ends of the recesses formed on the carriage.

In another aspect of the present invention, a linear motion guide unit is disclosed in which the projections formed on the carriage frame are provided at more than one location along lengthwise of the side panel.

In another aspect of the present invention, a linear motion guide unit in which the carriage frame has mounted with end seals, which are installed between the fore-and-aft end surfaces of the end caps and the inside surfaces of the end panels of the carriage frame. Moreover, the end seals fit in recesses, one to each recess, which are formed on the inside surfaces of the end panels of the carriage frame. In a further another aspect of the present invention a linear motion guide unit disclosed in which the end caps are each made on the outside end surface thereof with an overhang to fit in the recess on the inside surface of the associated end panel.

In another aspect of the present invention, a linear motion guide unit is disclosed in which all of the carriage frame, the end caps and the carriage are made with concaves conforming to the track rail, thus allowing the slider to fit over the track rail.

In another aspect of the present invention, a linear motion guide unit is disclosed in which there is provided a retainer band to keep the rolling elements in the carriage, with fitting in grooves formed on the end caps.

With the linear motion guide unit constructed as stated earlier, all of the carriage, the end caps and the carriage frame will be assembled mutually into a unitary composite construction ensured in desired rigidity or stiffness, rather than using any fastener such as bolts, screws and so on, by only press-fitting the projections of the carriage frame in the recesses of the carriage. The positioning means between the carriage and the end caps helps ensure the accurate position control among the components. Moreover, the lugs arranged on either the spacer or the carriage frame have advantages of providing the highly accurate turnaround in conjunction with the end caps, and further making the working process of the turnaround easier.

In the linear motion guide unit of the present invention, the slider moving along the track rail is constituted with only two components of the carriage and the composite of the carriage frame with the end caps, which are assembled into a united construction by mutual engagement of a fitting element with any complementary element, with no use of fasteners such as bolts and the like. This realizes reducing the number of components or parts, thus making the slider itself as small as possible. Thus, the present invention provides a linear motion guide unit that is applicable to machines diverse in type and size and most preferable for use in very small machines, with even requiring high precision.

DETAILED DESCRIPTION OF THE PREFERRED EMBODIMENTS

The present invention will be explained in detail by way of example with reference to the accompanying drawings. The linear motion guide unit according to the present invention is adapted for use in machinery as diverse as semiconductor manufacturing machines, assembly machines and so on, and more particular constructed as small as possible in size, with even inexpensive in manufacturing cost. To this end, the linear motion guide unit of the present invention is characterized in that a component has any engaging means coming into mutually fitting relation with a complementary engaging means of any counterpart to complete a composite construction with no use of fasteners, thus allowing reducing the number of parts or components required.

Referring first to FIGS. 1 to 21, there is shown a preferred embodiment of a linear motion guide unit of the present invention.

Figure 1:
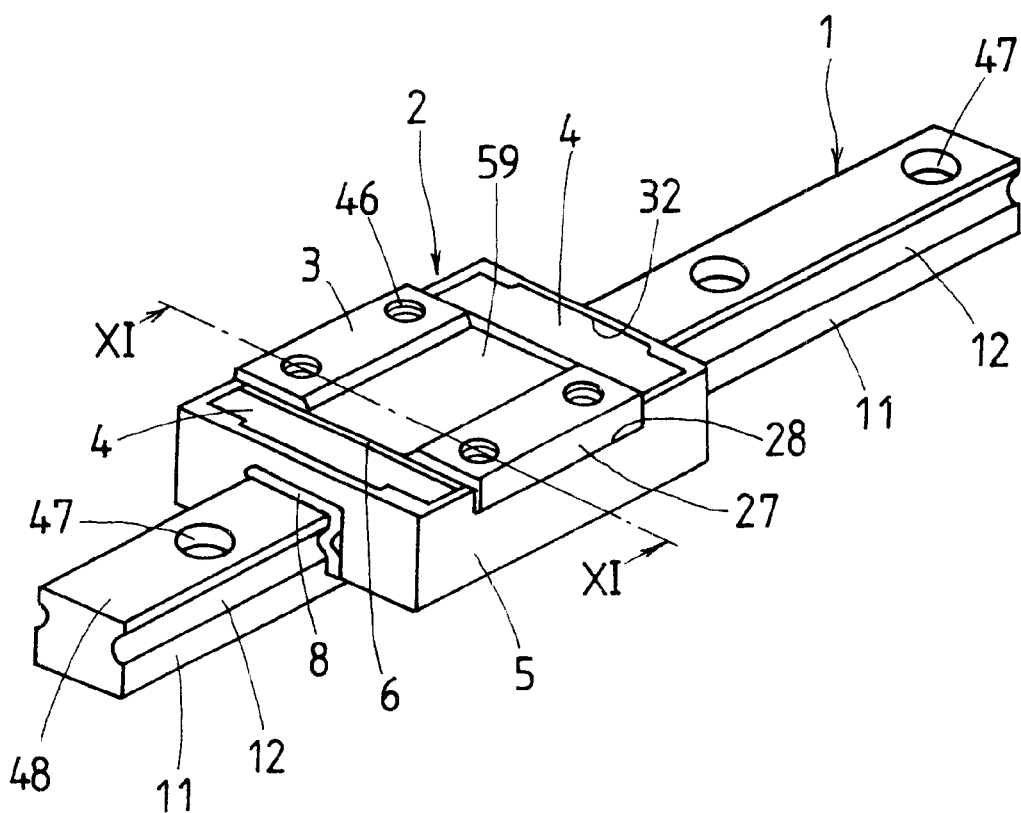
FIG. 1 is a perspective view illustrating an entire construction of a linear motion guide unit according to the present invention.
Figure 2:
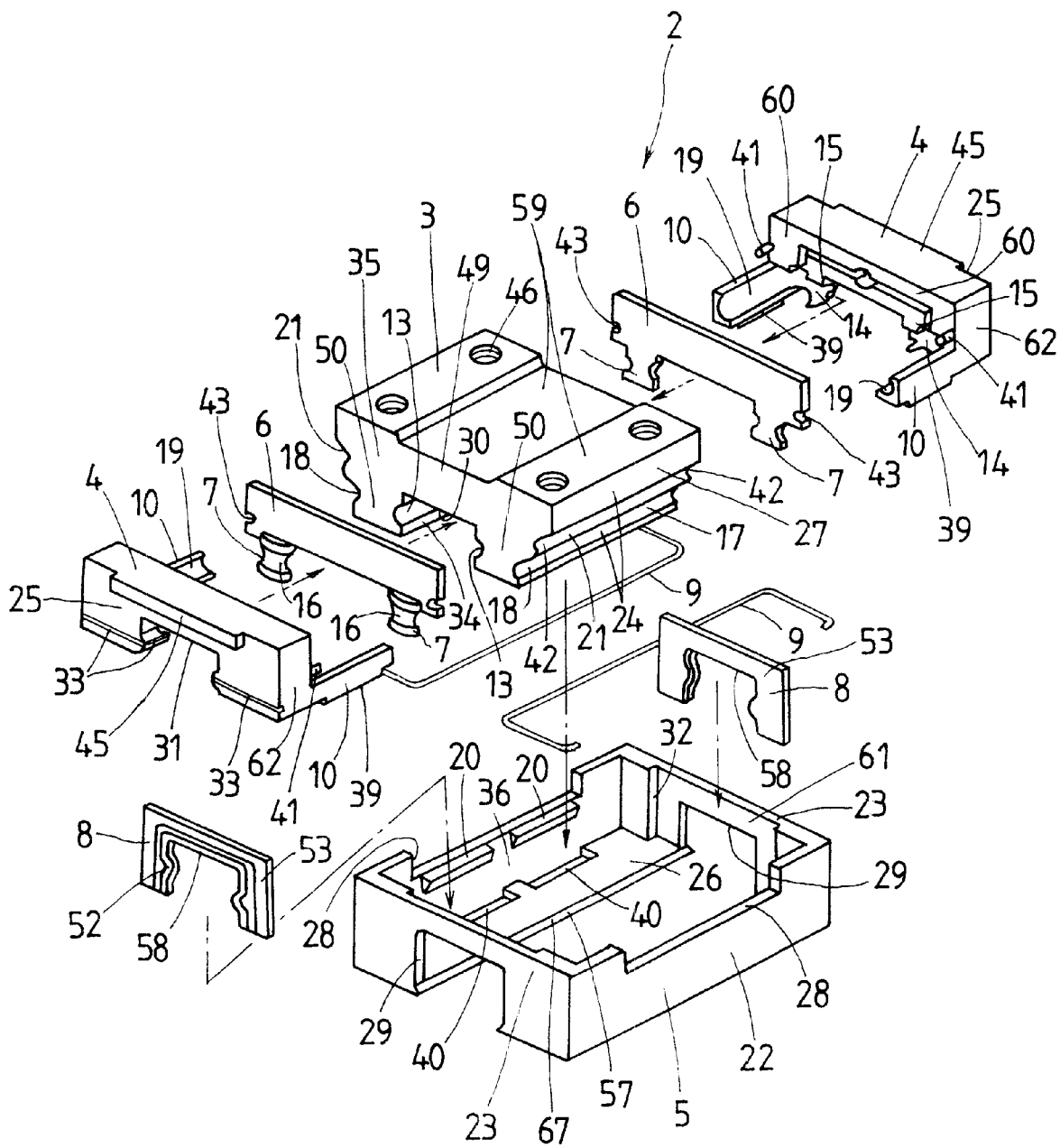
FIG. 2 is an exploded perspective view of a slider in the linear motion guide unit of FIG. 1, but in which rolling elements are removed.
Figure 3:
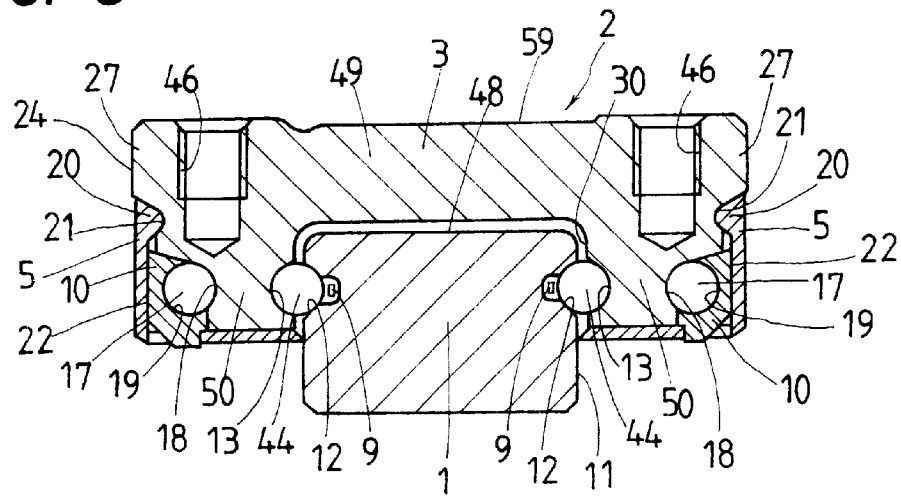
FIG. 3 is a traverse cross section taken in a perpendicular plane along a section XI—XI of FIG. 1.

The linear motion guide unit, as shown in FIGS. 1 to 3, is in general comprised of a track rail 1 made on widthwise opposing sides 11 thereof with lengthwise raceway grooves 12 or first raceway grooves, one to each side, a slider 2 fitting over and conforming to the track rail 1 and made with fore-and-aft raceway grooves 13 or second raceway grooves confronting the first raceway grooves 12 to define load raceways between them. The slider 2 is provided therein with return passages 17 and turnarounds 14 that are each connected at one end thereof with the associated return passage 17, while at another end thereof with the associated load raceway, thereby completing a recirculating circuit allowing rolling elements 44 to run through there. The track rail 1 is made on a top surface 48 thereof with bolt holes 47 that are used to fasten the track rail 1 to a stationary member such as a machine bed, base, machine frame and so on.

The slider 2 is composed of a carriage 3 having the raceway grooves 13 on inside surfaces 34 conforming to the track rail 1 and also having fore-and-aft grooves 18 for the return passages 17 and lengthwise recesses 21 on widthwise opposite outside surfaces 24 thereof, end caps 4 arranged on lengthwise opposite ends 35 of the carriage 3, one to each end, and made therein with the turnarounds 14, and a carriage frame 5 constituted with side plates 22 facing the outside surfaces 24 of the carriage 3 and end plates 23 opposing fore-and-aft outside surfaces 25 of the end caps 4. Moreover, the side plates 22 of the carriage frame 5 are made on the inside surfaces 36 thereof with lengthwise projections 20 that will fit in the recesses 21 of the carriage 3. In order to complete the slider 2, thus, all the carriage 3, end caps 4 and carriage frame 5 are combined in an unitary construction with the end caps 4 being accommodated in the carriage frame 5 while the projections 20 of the carriage frame 5 being held in engagement with the recesses 21 of the carriage 3.

Figure 4:
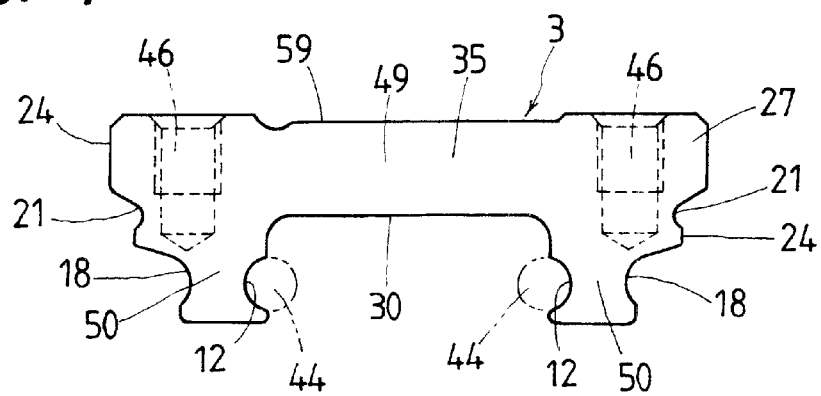
FIG. 4 is a front elevation of a carriage, which is a component shown in FIG. 1.
Figure 5:
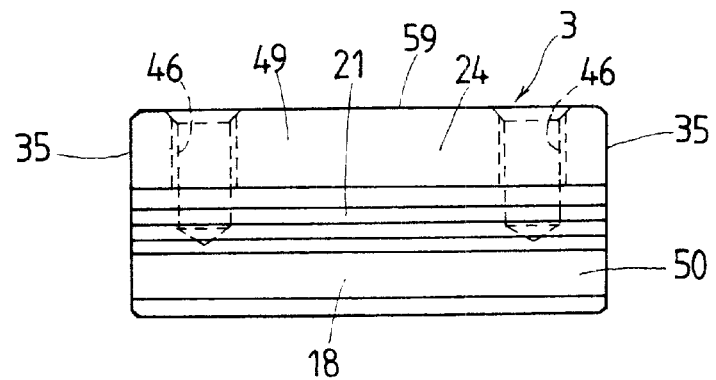
FIG. 5 is a side elevation of the carriage shown in FIG. 4.

In particular as shown in FIGS. 3 to 5, the carriage 3 includes therein a major section 49, and wings 50 extending downwards from breadthways opposite ends of the major section 49 to form a concave 30 that will fit over and conform to the track rail 1. The wings 50 have the raceway grooves 13 on their inside surfaces 34 exposed to the concave 30, and the lengthwise recesses 21 on their outside surfaces 24. The wings 50 are also made on their outside surfaces 24 with the grooves 18 for the return passages 17, which are just below the lengthwise grooves 34. When the carriage 3 is accommodated in the carriage frame 5, the major section 49 will fit at breadthways opposite sides 27 in recesses 28 of the carriage frame 5. In an upper surface 59 of the carriage 3 there are made bolt holes 46 that are used to fasten any tool or workpiece to the slider 2. In the embodiment stated here, the carriage 3 is made uniform in cross section throughout the overall length thereof while the lengthwise recess 21 is made to a V-notched configuration in cross section. Thus, the carriage 3 may be formed easily by extruding process.

The carriage frame 5 is made to a rectangular framework as a whole, which is constituted with a pair of side panels 22 and a pair of end panels 23. The carriage frame 5 also has a pair of bottom plates 26 covering underneath the carriage 3 and the end caps 4. With the carriage frame 5 constructed as stated above, the end panels 23 are each made with a concave 29 while an opening 57 is left fore-and-aft between the bottom plates 26, so that the carriage frame 5 may fit over and conform to the track rail 1. More than one projection 20, four projections shown in FIG. 2, is formed on the side panels 22 of the carriage frame 5. Moreover, the bottom plates 26 are each made with slots 40 that will come in engagement with a projection 39 that is formed underneath a tongue 10, which extends from the end cap 4 to provided a return-passage thereon.

Figure 10:
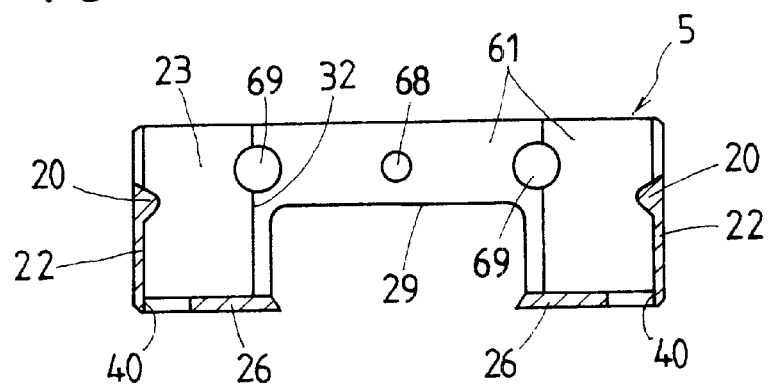
FIG. 10 is a traverse cross-section of the carriage frame, the view being taken in a plane II—II of FIG. 8.
Figure 11:
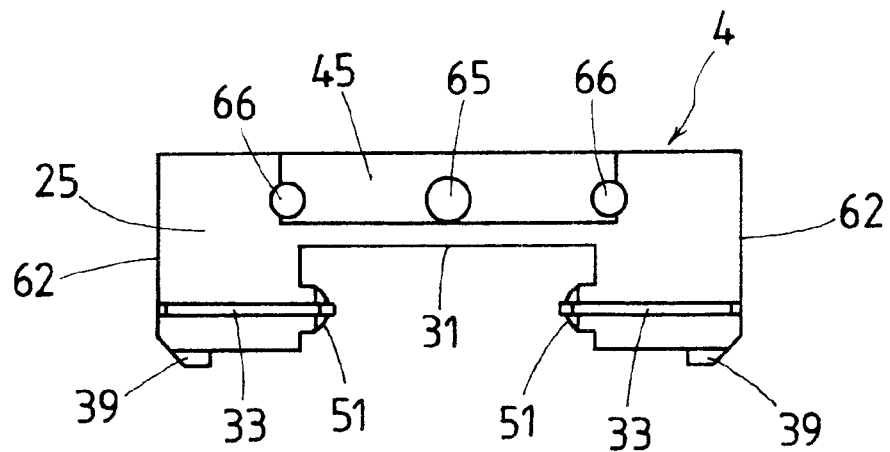
FIG. 11 is a front elevation of an end cap, which is a component shown in FIG. 1.

The rectangular slots 40 in the bottom plates 26 of the carriage frame 5 are formed to serve as passages allowing any mold or tool to extend through there to provide the projections 20 on the side panels 22 (refer to FIG. 10). Although the rectangular slots 40 are shown at two places per one bottom plate 26, it is preferable to make more than one slot 40 that is matched in number to that of the projection 20. Moreover, the rectangular slot 40 is preferably designed in a configuration that will be formed simply by molding or casting process and also is easy to flexibly come into press-fit with the associated projection 39 of the end cap 4. Thus, the projection 39 of the end cap 4, when fitting in the slot 40, clogs it to keep in place the end cap 4.

The side panels 22 of the carriage frame 5 is each made with the recess 28, which will come into fit-engagement with the associated side 27 of the carriage 3. On assembly of the carriage 3 into the carriage frame 5, the carriage 3 is first combined with the end caps 4 with the spacers 6 being interposed between the end caps 4 and the carriage 3, and then the resultant combination is accommodated and held in the carriage frame 5 by press fit of the projections 20 on the inside surfaces 36 of the side panels 22 of the carriage frame 5 into the recesses 21 on the outside surfaces 24 of the carriage 3. Thus, no fastener such as a bolt ever used is needed to complete the slider. With the slider in which all components are combined into a composite unit, the side panels 22 of the carriage frame 5 are arranged to cover both the widthwise opposite outside surfaces 24 of the carriage 3 and the sides 62 of the end caps 4, while the end panels 23 of the carriage frame 5 cover the forward and aft end surfaces 25 of the end caps 4, which are made with the concaves 31 to fit over and conform to the track rail 1. Further, the bottom plates 26 of the carriage frame 5 cover the lower surfaces of both the carriage 3 and the end caps 4, excepting an area corresponding to the concave 30 fitting over the track rail 1. Thus, the carriage frame 5 is said to serve as protector cover that comes to play a shielding effect to protect the combination of the carriage 3, end caps 4, spacers 6 and end seals 8.

The breadthways opposite sides 27 of the carriage 3 fit in the recesses 28 in the side panels 22 of the carriage frame 5 with the outside surfaces 24 of the carriage 3 being exposed outside so as to provide any reference surface when the slider 2 is secured to any other component such as a table and so on. As seen from FIG. 9, the end panels 23 are each relieved on the inside surface 61 to form a recess 32 in which the end seal 8 is allowed to fit. More than one projection 20 on the end panels 22, as shown in FIG. 10, is formed at the upper edges defining the recesses 28 in the side panels 22 and raised in a configuration so as to easily come into press-fit engagement with the recesses 21 of the carriage 3.

The end cap 4, as shown especially in FIGS. 2, 3 and 111 to 14, is installed on any one of the fore-and-aft ends 35 of the carriage 3 with the spacer 6 being interposed between them. The end cap 4 includes therein radially outside curved grooves 15 of the turnarounds 14, each of which is connected at one end thereof with the associated load raceway defined between the raceway groove 13 of the carriage 3 and the raceway groove 12 of the track rail 1, while at another end thereof with the associated tongue 10 that forms some part of the return passage 17. Above the radially outside curved grooves 15 of the turnaround 14 in the end cap 4 there are left cavities 63 opened to accommodate therein lugs 7 of the spacers 6. The lugs 7 are made thereon with radially inside curved grooves 16 to define the turnarounds 14 in conjunction with the radially outside curved grooves 15 in the end cap 4 when the lugs 7 is placed in the cavities 63 with their radially inside curved grooves 16 being in opposition to the radially outside curved grooves 15. Thus, the turnarounds 14 may be completed by combining the end cap 4 with the spacer 6 with the radially inside curved grooves 16 being held in opposition to the radially outside curved grooves 15 to define curved non-loaded raceways between them.

Figure 6:
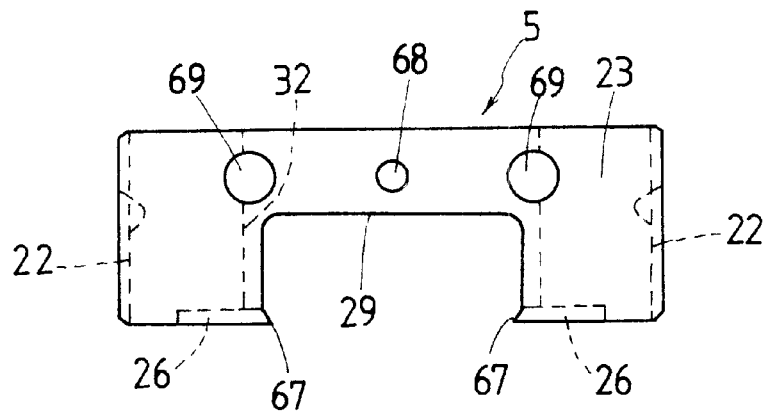
FIG. 6 is a front elevation of a carriage frame, which a component shown in FIG. 1.
Figure 7:
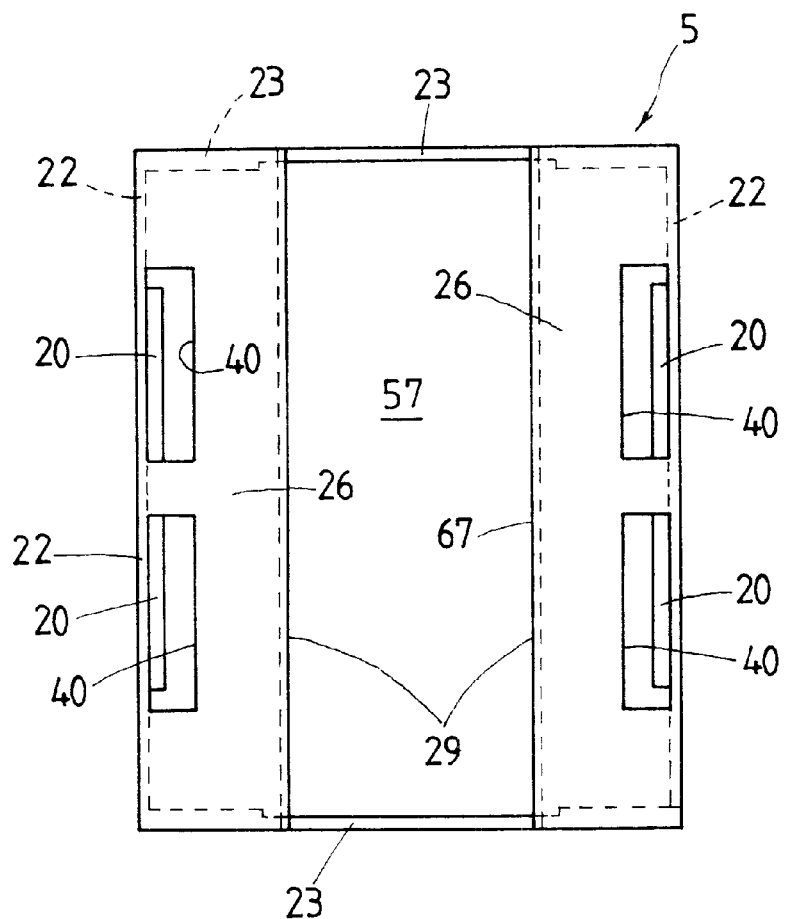
FIG. 7 is a bottom plan view of the carriage frame of FIG. 6.
Figure 8:
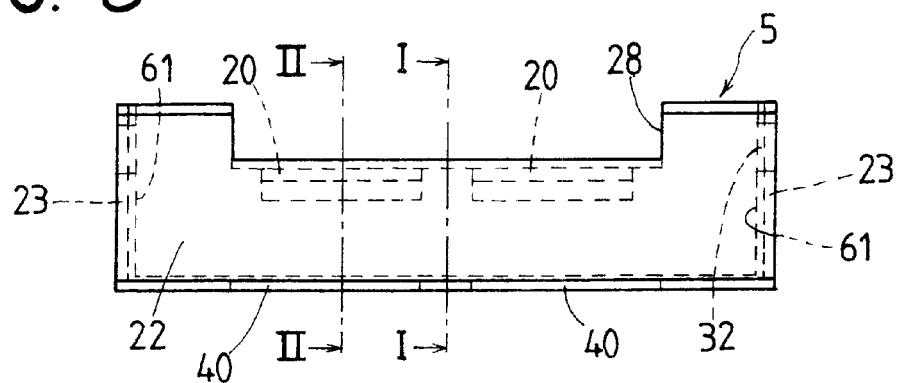
FIG. 8 is a side elevation of the carriage frame shown in FIG. 6.
Figure 9:
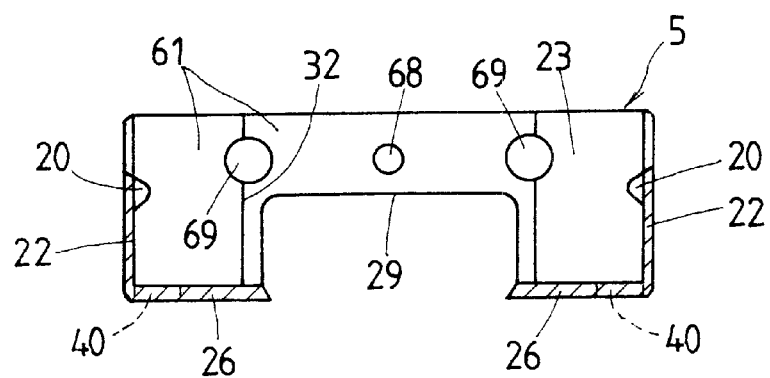
FIG. 9 is a traverse cross-section of the carriage frame, the view being taken in a plane I—I of FIG. 8.
Figure 12:
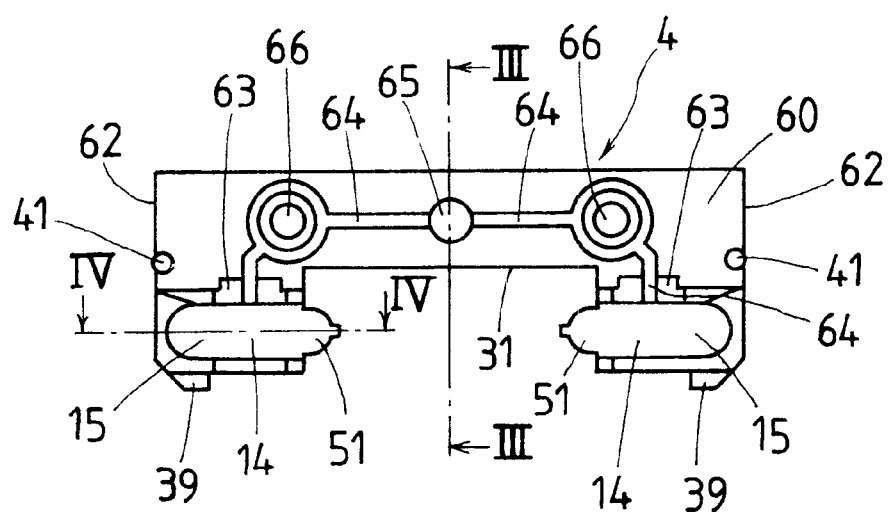
FIG. 12 is a rear elevation of the end cap shown in FIG. 11.

As shown in FIG. 12, the end cap 4 has therein a lubricant passage 64 to lead lubricant to the turnarounds 14, and a central hole 65 to receive therein a grease nipple and so on. In the end cap 4 there are also provided breadthwise opposite holes 66 to fasten any other components on the outside end surface 25 of the end cap 4. Correspondingly, the carriage frame 5, as seen from FIG. 6, is made with a central hole 68 matched in position to the central hole 65 of the end cap 4, and other holes 69 formed in alignment with the sidewise holes 66 of the end cap 4.

Each turnaround 14 is defined between the radially outside curved groove 15 formed in the end cap 4 and the radially inside curved groove 16 formed on the associated lug 7, which extends from the spacer 6 that will be interposed between the carriage 3 and the carriage frame 5, with extending sidewise between the breadthwise opposite side panels 22 of the carriage frame 5. Arranging the spacer 6 between any one of fore-and-aft ends 35 of the carriage 3 and an inside surface 60 of the associated end cap 4 results in providing the turnarounds 14 between the outside curved grooves 15 of the end cap 4 and the radially inside curved grooves 16 of the lugs 7. The turnaround 14 is adjusted in cross section to a size adequate for allowing rolling elements 44, or balls, to turn about there.

The return passage 17 is constituted with the inside raceway groove 18 formed on the carriage 3, and the outside raceway groove 19 formed on the tongue 10 extending lengthwise from the end cap 4 in opposition to the inside raceway groove 18. That is to say, the tongue 10 arranged in opposition to the raceway groove 18 of the carriage 3 is made with the raceway groove 19 of semi-circular in cross section, which continues to the radially outside curved groove of the turnaround 14 in flush relation with each other. Accordingly, when the end caps 4 are installed on the fore-and-aft ends 35 of the carriage 3, one to each end, the tongues 10 of the end caps 4 come in abutment to each other at their extremities thereby completing the return passage 17 defined between the inside raceway groove 18 of the carriage 3 and the outside raceway groove 19 of the end caps 4.

Figure 13:
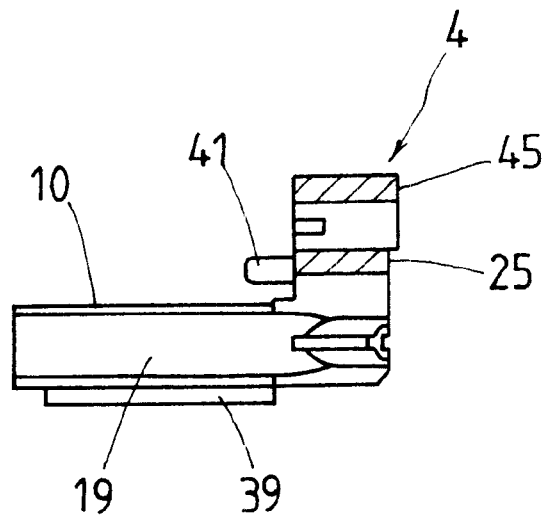
FIG. 13 is a cross-sectional view of the end cap, the view being taken in a plane III—III of FIG. 12.
Figure 14:
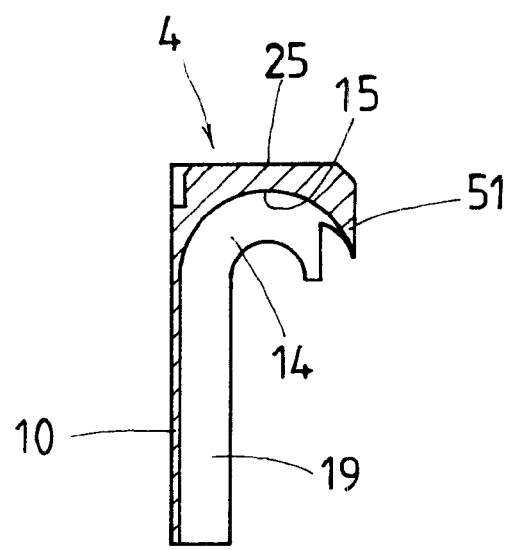
FIG. 14 is a cross-sectional view of the end cap, the view being taken in a plane IV—IV of FIG. 12.

The end cap 4, as shown in FIGS. 2, 12 and 13, has positioning pins 41 on the inside surface 60 thereof confronting the carriage 3. The end cap 4 will be mounted with accuracy in position to the carriage 3 by fitting the positioning pins 41 through positioning means or positioning holes 43 of the spacer 6 into positioning means 42 at the associated ends of the recesses 21 formed on the carriage 3. With the state where the positioning pins 41 of the end caps 4 are held in fitting relation in the ends of the recesses 21, the composite construction of the carriage 4 and the end caps 4 is accommodated in the carriage frame 5 so that both the widthwise opposite outside surfaces 24 of the sides 62 of the end caps 4 are brought into contact with the breadthwise opposite side panels 22 in a manner making the sides 27 of the carriage 3 fit in the recesses 28 formed in the side panels 22 of the carriage frame 5 whereby both the carriage 3 and the end caps 4 are installed and held in the carriage frame 5. Besides, the end caps 4 are each provided therein with a claw 51 to scoop the rolling elements out of the associated load raceway defined between the confronting raceway grooves 12, 13 of the track rail 1 and the carriage 3.

The end seals 8 to cover clearance between the end panels 23 of the carriage frame 5 and the track rail 1 are each installed in the associated recess 32 inside the end panel 23 of the carriage frame 5 and interposed between the associated end surface 25 of any one end cap 4 and the inside surface of the associated end panel 23 of the carriage frame 5. Each end cap 4 has an overhang 45 extending from the upper edge of the outside end surface 25 in the form conforming to the recess 32 in the end panel 23 of the carriage frame 5. When the end caps 4 have been accommodated together with the carriage 3 in the carriage frame 5, the overhangs 45 of the end caps 4 fit in the recesses 32 in the end panels 23 of the carriage frame 5 to abut against the upper edges of the end seals 8, which are thus kept in sealing contact with the track rail 1. Along the lower edges across the concave 29 of the end panels 23 of the carriage frame 5 there are provided lips 67 resembling a knife edge in cross section and extending towards the track rail 1 to provide bottom seals of the slider 2.

Figure 18:
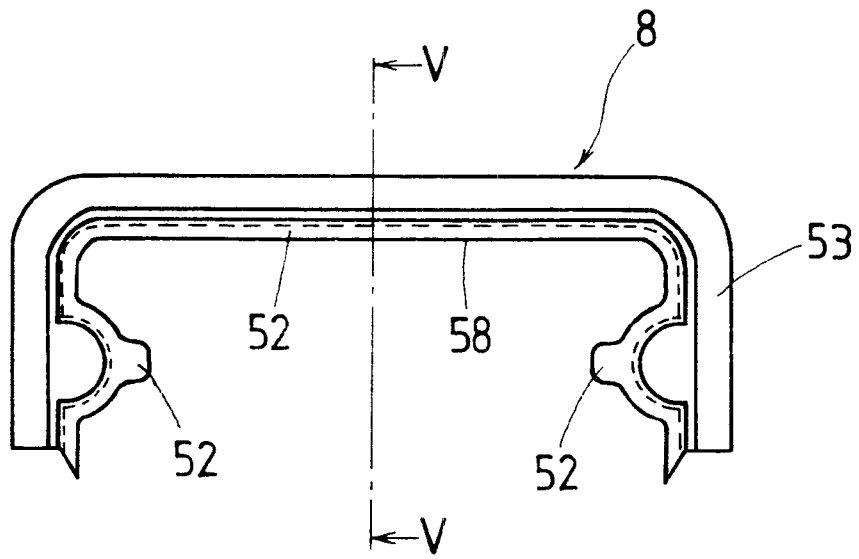
FIG. 18 is a front elevation of an end seal, which is a component shown in FIG. 1.
Figure 19:
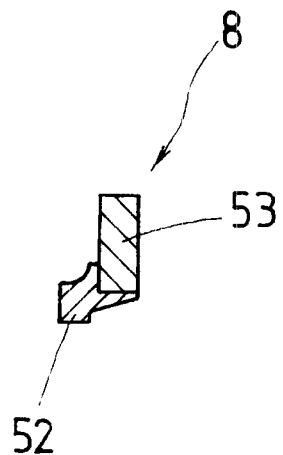
FIG. 19 is a traverse cross-section of the end seal, the view being taken in a plane V—V of FIG. 18.

Referring to FIGS. 18 and 19, there is shown the end seal 8 having a metal core 53 on which is fused synthetic rubber to form ridge 52 to seal the clearance between the track rail 1 and the slider 2. The end seals 8 are each fit in the recess 32 formed on the inside surface 61 of any one of the end panels 23 of the carriage frame 5, and held in a situation looking inside the periphery of the concave 29 in the end panel 23. Moreover, the overhang 45 extending out of the end surface 25 of the end cap 45 comes into abutment against the upper end of the end seal 8 to keep secure sliding contact of the ridge 52 with the track rail 1, thus ensuring the constant seal between the track rail 1 and the slider 2. Thus, the end seal 8, as made of the metal core 53 of thin plate of an inverted U-shape on the inside edge of which is fused the ridge 52, may be made slim in overall construction.

Figure 15:
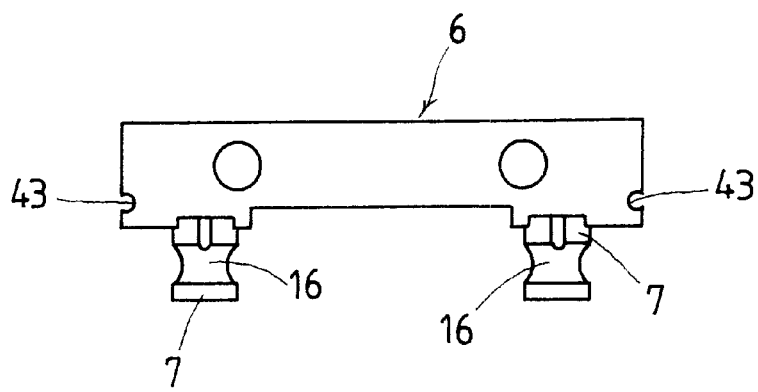
FIG. 15 is a front elevation of a spacer, which is a component shown in FIG. 1.
Figure 16:
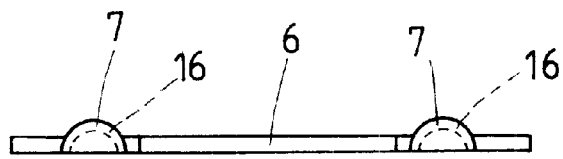
FIG. 16 is a bottom plan view of the spacer of FIG. 15.
Figure 17:
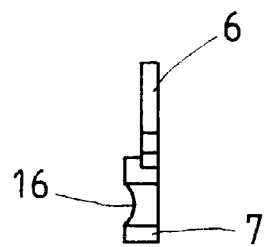
FIG. 17 is a side elevation of the spacer shown in FIG. 15.

The carriage frame 5, carriage 3, end caps 4 and end seals 8 are made with concaves 29, 30, 31 and 58, respectively, which conform to the track rail 1 so that the slider 2 is allowed to fit over the track rail 1. Besides, the lugs 7 of the spacer 6, as apparent from FIGS. 15 to 17, are spaced apart away from each other with a breadthwise interval conforming to the track rail 1. The lug 7 alone is too small in size and, therefore, it is very tough or troublesome to fit snugly the separate lug 7 in the associated cavity 63 to provide the radially inside curved groove for the turnaround in the miniature linear motion guide unit. In contrast, the spacer 6 in which a pair of the lugs 7 is connected to a thin plate makes easier the assembly procedure to install the lugs 7 in the end cap 4.

Figure 20:
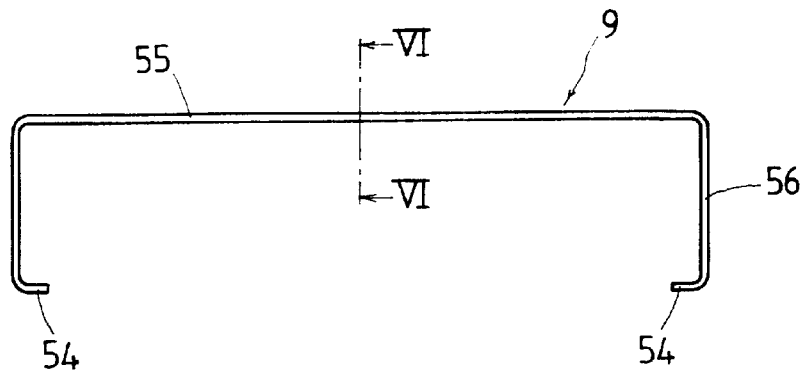
FIG. 20 is a top plan view of a retainer band, which a component shown in FIG. 1.
Figure 21:
FIG. 21 is a cross-sectional view of the retainer band, the view being taken in a plane VI—VI of FIG. 20.
Figure 22:
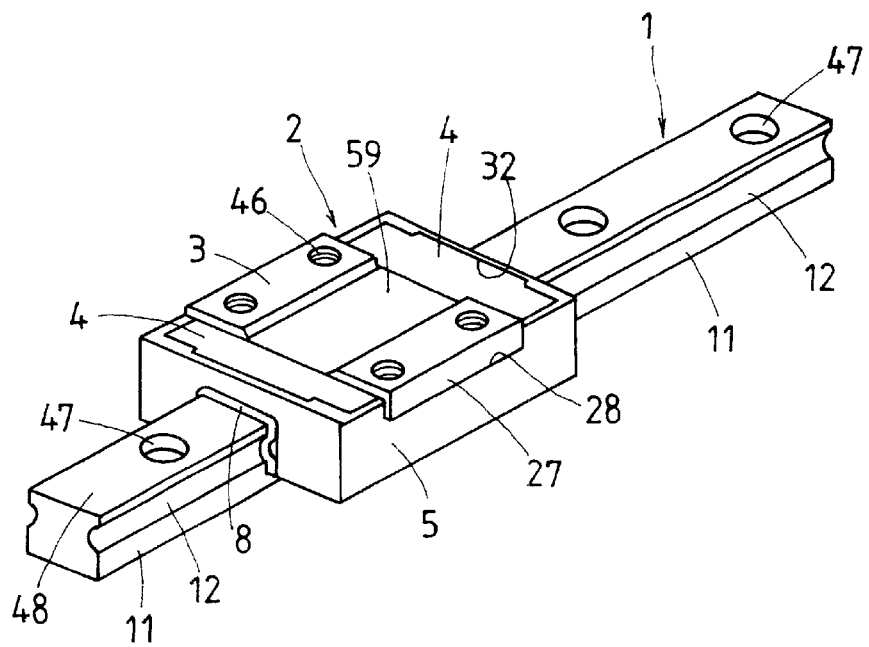
FIG. 22 is a perspective view showing another embodiment of a linear motion guide unit according to the present invention.

Referring especially to FIGS. 20 and 21, there is shown a retainer band 9 to keep the rolling elements 44 in the carriage 3, with the opposite ends thereof being grooved at 33 of the end caps 4. Each retainer band 9 is constituted with a major section 55 to keep the rolling elements 44 against falling off the carriage 3 between the end caps 4 having therein means for retaining the rolling elements 44, fastening arms 56 bent sidewise at lengthwise opposite ends of the major section 55, and engaging ends 56 bend in a manner extending along the outside sides of the end caps 4. The retainer bands 9 are each held to the end caps 4 with the fastening arms 56 and the engaging ends 56 being fit in the grooves 33 around the end caps 4. For the purpose of engagement of the retainer band 9 with the end caps 4, the grooves 33 on the end caps 4 extend outside the claws 51 to the inside surfaces 60 of the end caps 4.

With the carriage 3 having mounted on the fore-and-aft end surfaces 35 thereof with the end caps 4 and the spacers 6, the retainer bands 9 are arranged in such a manner that their major sections lie in opposition to the raceway grooves 13 of the carriage 3, while their bent ends fit in the grooves 33 on the outside end surfaces 25 of the end caps 4. Then, after the composite construction of the carriage 3 and the end caps 4 tied together has accommodated in the carriage frame 5, the end seals 8 are each fit into the recess 32 left open between any one of the inside surfaces 61 of the carriage frame 5 and the associated outside end 25 of any one end cap 4. Finally for completing the slider 2, the rolling elements 44 are charged under the state where the retainer bands 9 are deflected elastically to separate away from the raceway grooves 13.

Another embodiment of the linear motion guide unit according to the present invention will be hereinafter described with reference to FIGS. 22 to 32. Compared with the embodiment stated earlier, the linear motion guide unit to be stated later is substantially identical in construction, rather than a construction in which there is no spacer 6 and therefore the lugs 7 are secured upright on the bottom plates 26 of the carriage frame 5, and another construction in which the tongues 10 extending from the end caps 4 to provide the return-passage grooves 38 are too short to complete the overall desired length of the return passages and therefore any extension members 37 made thereon with the return-passage grooves 38 are installed in the carriage frame 5 to make up for the shortage of the return passages. Thus, the like reference numerals designate the components or parts identical or equivalent in function with that used in the first embodiment stated earlier, so that the previous description will be applicable.

With the embodiment stated hereinafter, there is no spacer 6 of the type used in the first embodiment, but the lugs 7 are planted upright on the bottom plates 26 of the carriage frame 5 at positions opposing to the radially outside curved grooves 15 in the end caps 4 to provide the turnarounds 14 between them. Although the lugs 7 of the second embodiment have the same radially inside curved grooves 16 for the turnarounds as before, the arrangement in which the lugs 7 stand on the bottom plates 26 of the carriage frame 5 results in reducing the number of required parts or components and also rendering the assembly process simple, compared with the arrangement recited earlier in the first embodiment.

In the carriage frame 5 there are installed the extension members 37 on which are formed the raceway grooves 38 for the return passages, which will form a desired length of the return passages together with the raceway grooves 19 in the end caps 4 secured on the fore-and-aft end surfaces 35 of the carriage 3. As shown especially in FIGS. 23 and 27, the extension members 37 in the carriage frame 5 are each arranged at any inside corner where any side panel 22 joins together with the associated bottom plate 26 and also at an area midway the length of the side panel 22. The recirculating-ball circuits allowing the rolling elements 44 to run through there will be completed by connection of the raceway grooves 38 on the extension members 37 to the raceway grooves in the widthwise opposite tongues 10 of the end caps 4 mounted on the fore-and-aft ends of the carriage 3. Thus, the return passages are constituted with the raceway grooves 18 formed on the carriage 3, the raceway grooves 19 formed in the tongues 10 of the end caps 4 and the raceway grooves 38 formed on the extension members 37 in the carriage frame 5.

Figure 23:
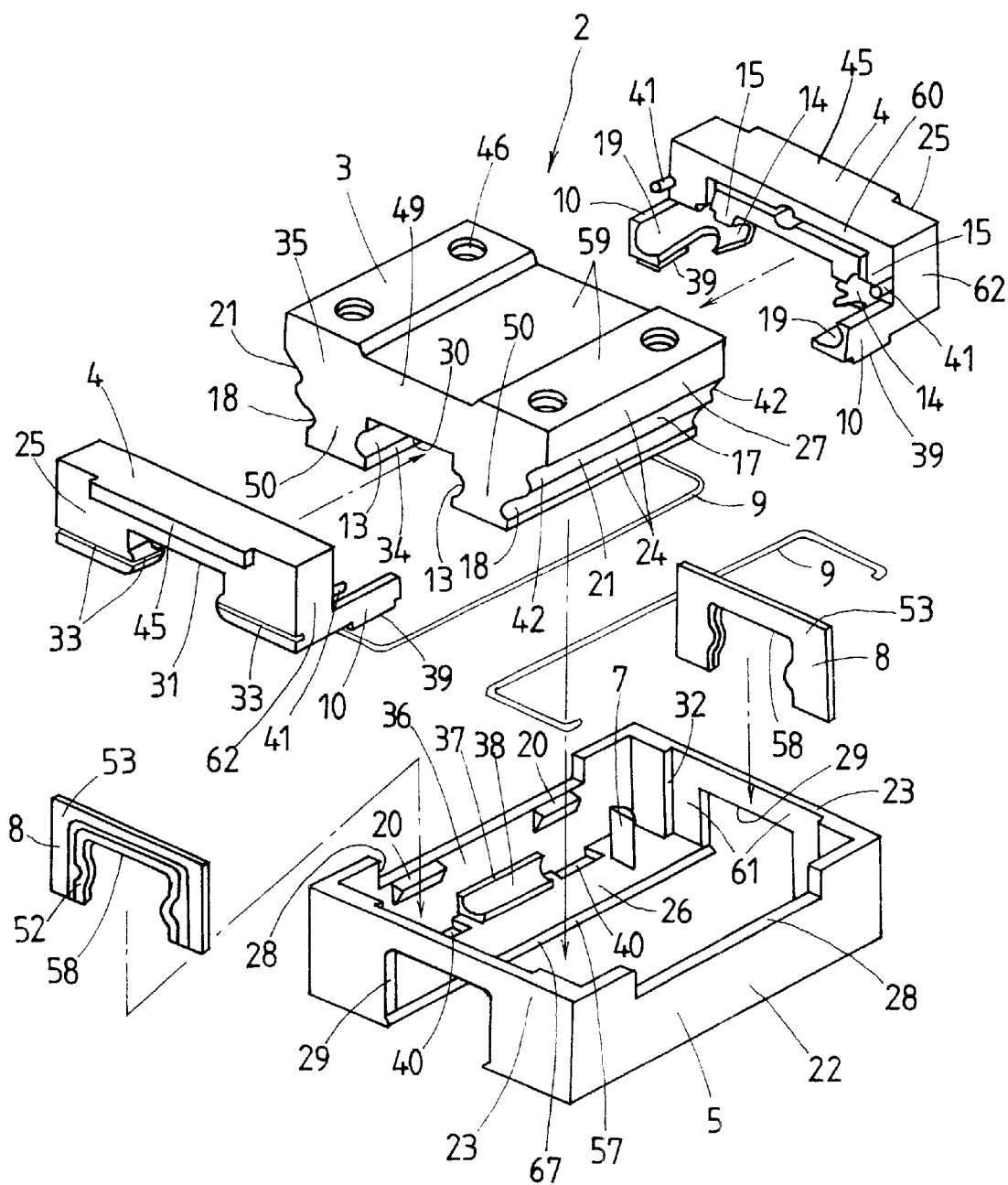
FIG. 23 is an exploded perspective view of a slider in the linear motion guide unit of FIG. 22, but in which rolling elements are removed.
Figure 24:
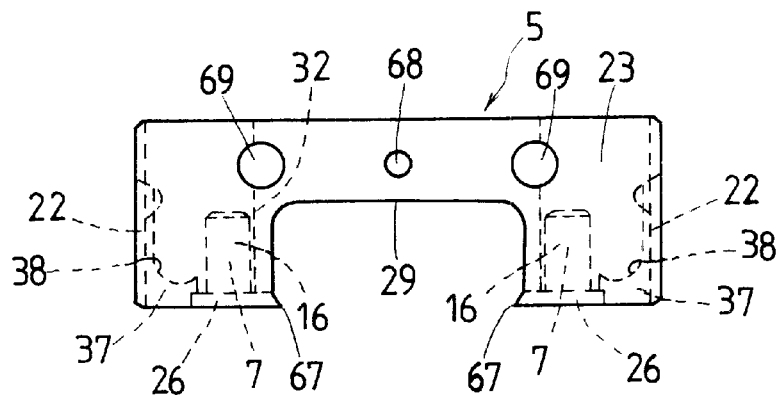
FIG. 24 is a front elevation of a carriage frame, which a component shown in FIG. 22.
Figure 25:
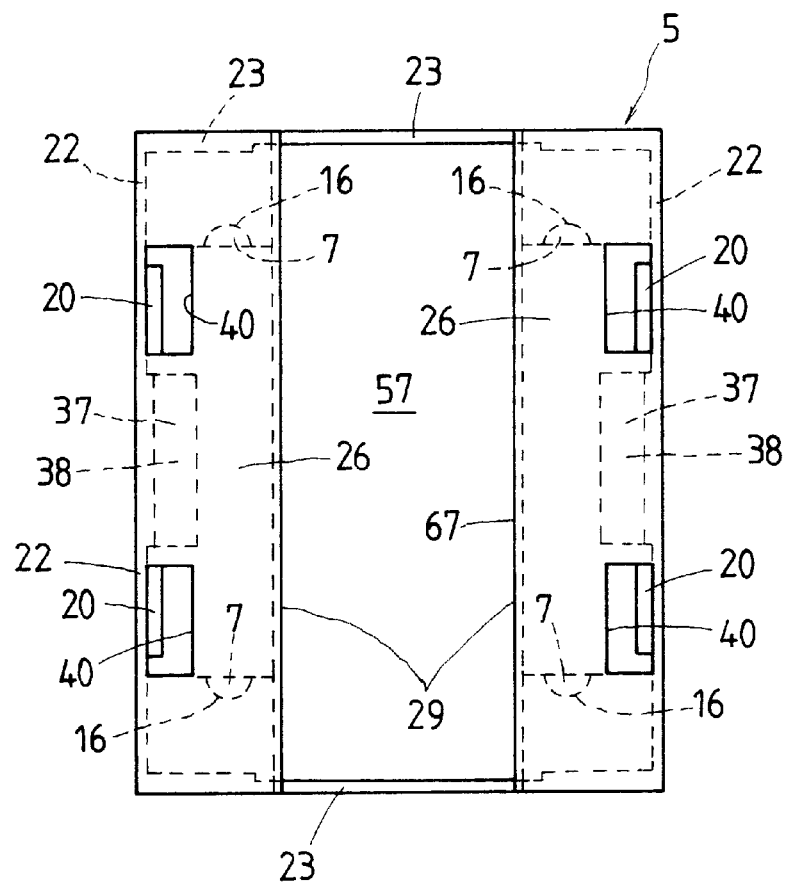
FIG. 25 is a bottom plan view of the carriage frame of FIG. 24.
Figure 26:
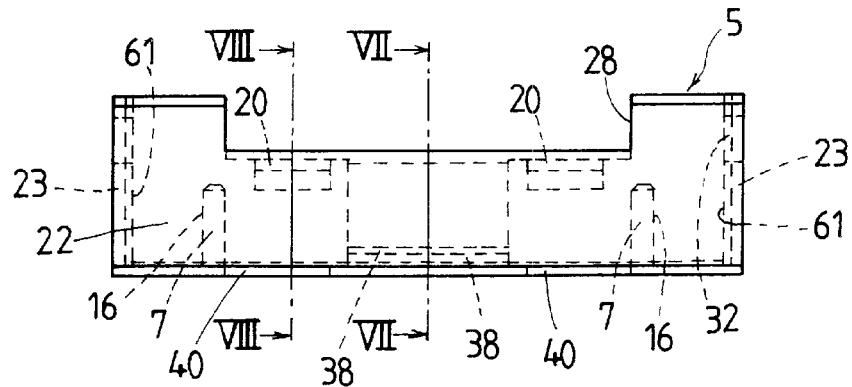
FIG. 26 is a side elevation of the carriage frame shown in FIG. 24.
Figure 27:
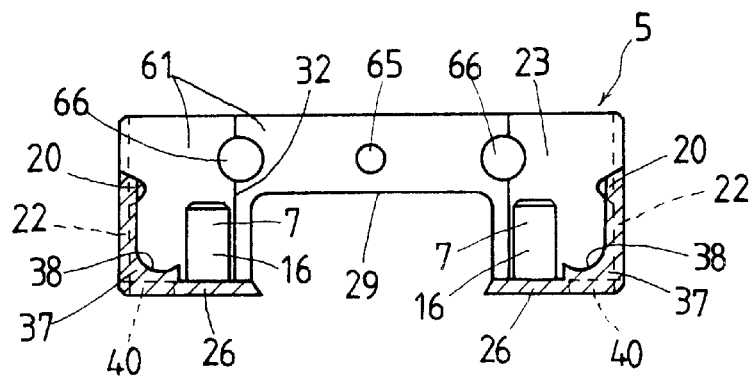
FIG. 27 is a traverse cross-section of the carriage frame, the view being taken in a plane VII—VII of FIG. 26.
Figure 28:
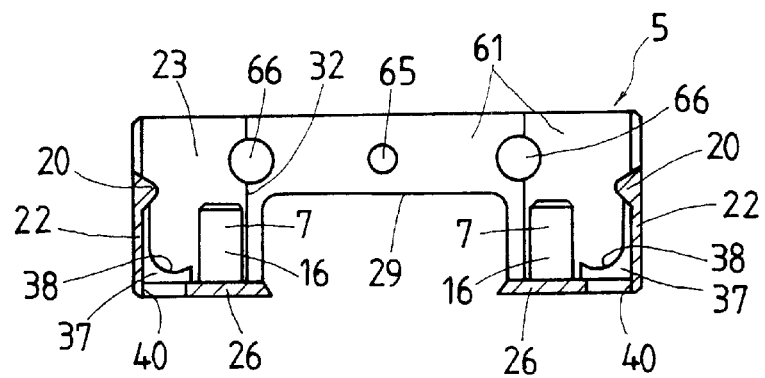
FIG. 28 is a traverse cross-section of the carriage frame, the view being taken in a plane VIII—VIII of FIG. 26.
Figure 29:
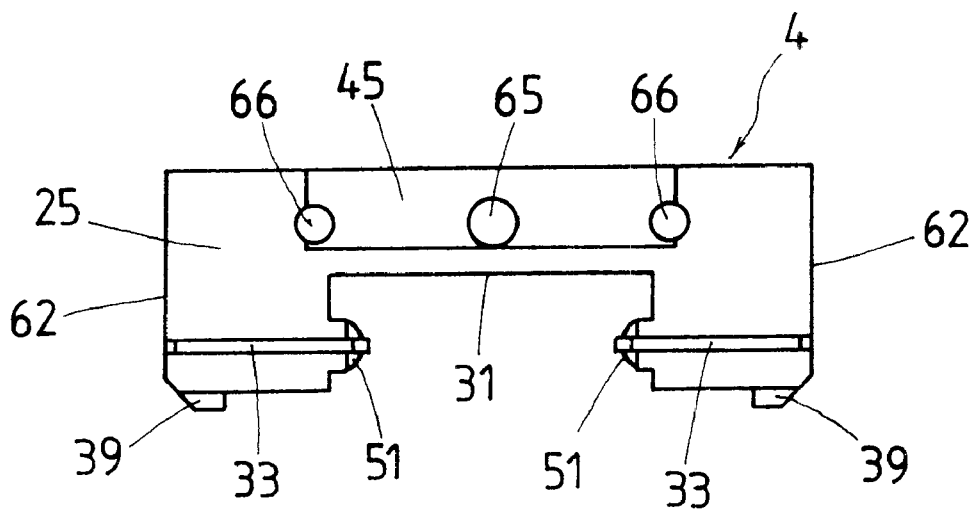
FIG. 29 is a front elevation of an end cap, which is a component shown in FIG. 22.
Figure 30:
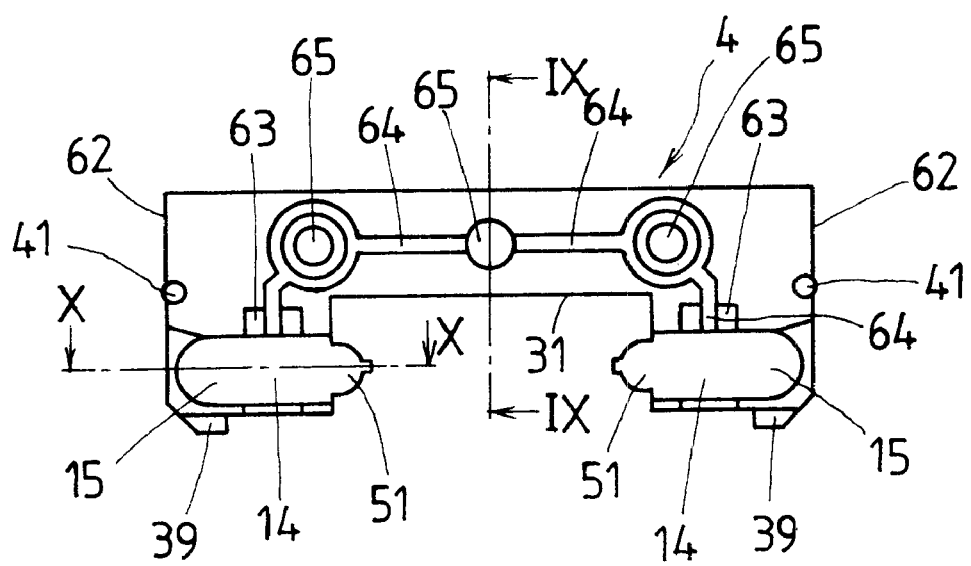
FIG. 30 is a rear elevation of the end cap shown in FIG. 29.
Figure 31:
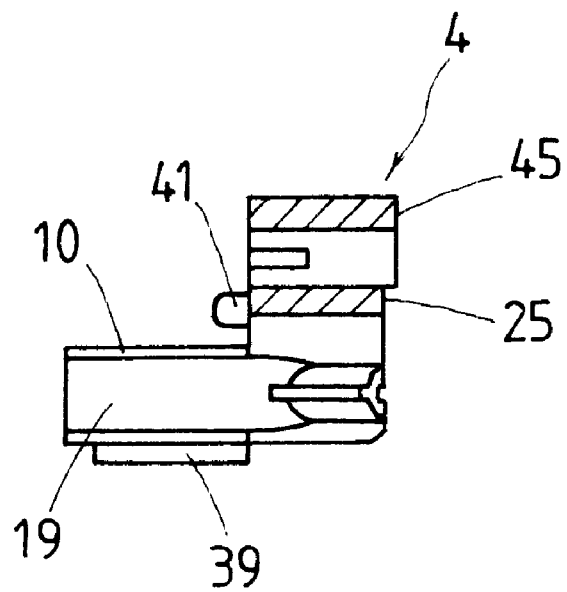
FIG. 31 is a cross-sectional view of the end cap, the view being taken in a plane IX—IX of FIG. 30.
Figure 32:
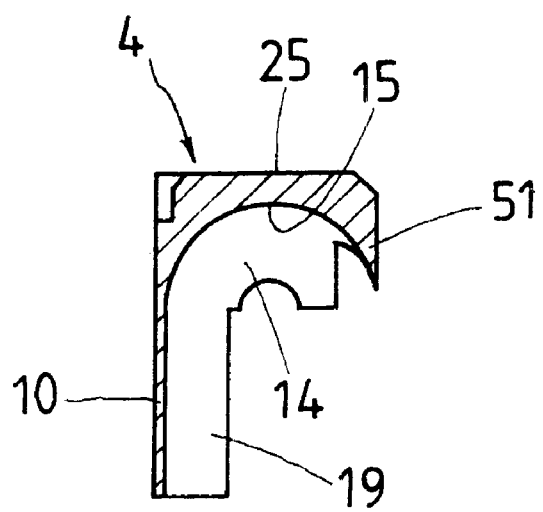
FIG. 32 is a cross-sectional view of the end cap, the view being taken in a plane X—X of FIG. 30.

On assembling the components into the slider 1, as shown in detail in FIG. 23, the carriage 3 has mounted on the fore-and-aft ends thereof with the end caps 4, while the retainer bands 9 is arranged in opposition to the raceway grooves 13 in the carriage 3 and fit in the grooves 33 on the outside end surfaces 25 of the end caps 4. Then, the resulting composite construction is accommodated together with the end seals 8 into the carriage frame 5. Finally the rolling elements 44 are charged into the recirculating-ball circuits of the completed slider 2. Charging the rolling elements 44 in the recirculating-ball circuits may be carried out with the retainer bands 9 being deflected elastically to separate away from the raceway grooves 13. The carriage 3 according to the embodiment discussed now, as with the first embodiment stated before, is held in the carriage frame 5 by press fit of the projections 20 on the inside surfaces 36 of the side panels 22 of the carriage frame 5 into the recesses 21 on the outside surfaces 24 of the carriage 3. Thus, no fastener such as a bolt ever used is needed to complete the slider.

It will be obvious that the linear motion guide unit of the present invention is not limited to the linear guide arrangement constructed as stated earlier; the carriage frame 5 with the extension members 37 for the return passages therein may be of course applied to the first embodiment shown in FIG. 2 to cope with various specifications in which the carriage differs in the length. For example, the slider 2 requiring high load capacities uses necessarily the increased number of rolling elements to stand up to the large load. To this end, even if the load condition needs the carriage 3 long in the raceway groove 13, the designer has only to select the carriage frame 5 made to the length allowing for the increased number of rolling elements to provide the slider conforming to the desired load capacity. With the slider 2 constructed according to the present invention, moreover, as opposed to the prior circuit in which the raceway is connected at any transitional area between the linear return passage and the curved turnaround, the recirculating-ball circuit in the slider is connected to complete a recirculating raceway at any area within the linear return passage 17. This helps ensure the rolling elements 44 run smoothly through the recirculating-ball circuit.

What is claimed is:

1. A linear motion guide unit; comprising a track rail having first raceway grooves on lengthwise sides thereof, a slider conforming to the track rail to fit over the track rail for movement relatively to the track rail and also having second raceway grooves confronting the first raceway grooves, and a recirculating-ball circuit allowing rolling elements to run through there, the recirculating-ball circuit including a load raceway defined between the first and second raceway grooves, a turnaround formed in the slider and connected at any one end thereof with the load raceway, and a return passage formed in the slider and connected to another end of the turnaround;

wherein the slider is composed of a carriage having the second raceway grooves on inside surfaces thereof and also having recesses and return-passage grooves on outside surfaces thereof, end caps arranged on fore-and-aft ends of the carriage, one to each end, and each made therein with the turnaround, and a carriage frame constituted with side panels facing the outside surfaces of the carriage and end panels facing fore-and-aft outside end surfaces of the end caps; and wherein the side panels of the carriage frame are each made on inside surface thereof with a projection to fit in the associated recess of the carriage, so that the carriage is accommodated together with the end caps into the carriage frame in such a manner that the projection of the carriage frame fits in the recess of the carriage to hold the carriage, end caps and carriage frame in a unitary composite construction.

2. A linear motion guide unit constructed as defined in claim 1 wherein the carriage frame has a bottom plate covering underneath lower surfaces of the carriage and the end caps.

3. A linear motion guide unit constructed as defined in claim 1 wherein the side panels of the carriage frame are provided therein with recesses in which sides of the carriage are allowed to fit.

4. A linear motion guide unit constructed as defined in claim 1 wherein the turnarounds are each composed of a radially outside curved groove formed in the end cap, and a radially inside curved groove formed on a lug.

5. A linear motion guide unit constructed as defined in claim 4 wherein the lug is attached to a spacer, which is interposed between the carriage and any one of the end caps, with extending breadthwise between the side panels of the carriage frame.

6. A linear motion guide unit constructed as defined in claim 4 wherein the lug is attached to the bottom plate of the carriage frame.

7. A linear motion guide unit constructed as defined in claim 1 wherein the return passage is composed of an inside raceway groove formed on the carriage, and an outside raceway groove formed in a tongue extending from the end cap in opposition to the inside raceway groove on the carriage.

8. A linear motion guide unit constructed as defined in claim 7 wherein the carriage frame has an extension member on which is formed a raceway groove to be communicated with the raceway grooves of the end caps arranged on the fore-and-aft end surfaces of the carriage.

9. A linear motion guide unit constructed as defined in claim 7 wherein the bottom plate of the carriage frame is made therein with a hole, which is allowed to come into engagement with a projection that is formed underneath the tongue extended from the end cap.

10. A linear motion guide unit constructed as defined in claim 1 wherein the end cap has positioning pins to be fit into ends of the recesses formed on the carriage.

11. A linear motion guide unit constructed as defined in claim 1 wherein the projections formed on the carriage frame are provided at more than one location along lengthwise of the side panel.

12. A linear motion guide unit constructed as defined in claim 1 wherein the carriage frame has mounted with end seals, which are installed between the fore-and-aft end surfaces of the end caps and the inside surfaces of the end panels of the carriage frame.

13. A linear motion guide unit constructed as defined in claim 12 wherein the end seals fit in recesses, one to each recess, which are formed on the inside surfaces of the end panels of the carriage frame.

14. A linear motion guide unit constructed as defined in claim 13 wherein the end caps are each made on the end outside surface thereof with an overhang to fit in the recess on the inside surface of the associated end panel.

15. A linear motion guide unit constructed as defined in claim 1 wherein all of the carriage frame, the end caps and the carriage are made with concaves conforming to the track rail, thus allowing the slider to fit over the track rail.

16. A linear motion guide unit constructed as defined in claim 1 wherein there is provided a retainer band to keep the rolling elements in the carriage, with fitting in grooves formed on the end caps.

* * * * *